United States Patent [19]
Bakke

[11] 3,823,819
[45] July 16, 1974

[54] COMBINED HARVESTER, GRAIN AUGER AND CLEANER
[76] Inventor: Elmer L. Bakke, Box 87, Kensal, N. Dak. 58455
[22] Filed: Oct. 17, 1972
[21] Appl. No.: 298,244

[52] U.S. Cl.................... 209/12, 209/283, 209/421
[51] Int. Cl.............................................. B07b 9/00
[58] Field of Search....... 209/32, 33, 283, 295, 420, 209/421, 312, 318, 12; 241/60, 61, 78

[56]  References Cited
UNITED STATES PATENTS
1,781,472   11/1930   Nagle............................. 209/283 X
3,587,858   6/1971   Christianson................... 209/283 X Primary Examiner—Frank T. Yost
Attorney, Agent, or Firm—Clarence A. O'Brien; Harvey B. Jacobson

[57] ABSTRACT
An inclined grain auger conveyor provided with first and second upper and lower vertically registered auger assemblies. Both of the auger assemblies include sections therein wherein the auger screw is provided with circumferentially spaced and longitudinally extending bars and the housing portion includes removable grate sections in lieu of the more conventional screening sections which generally extend substantially the full length of each auger conveyor outer housing. The forward end of the auger conveyor is provided with an auger extension for disposition in a pile of grain and to convey grain to the lower end of the grain cleaning portion of the auger assembly. In order to mount the cylindrical bars on the auger screw portions of the auger assemblies adjacent flutes of the auger screw are provided with sets of longitudinally spaced and aligned notches spaced circumferentially about the auger screw and the cylindrical bars are secured within these notches. In each section of each auger assembly where the cylindrical bars are used, the usual screen portions of the housing of the auger assembly are replaced by grates wherein the grain auger and cleaner may not only clean but also thresh the cut grain being handled by the auger and cleaner.

12 Claims, 9 Drawing Figures

3,823,819
Patented Jul 16 1974
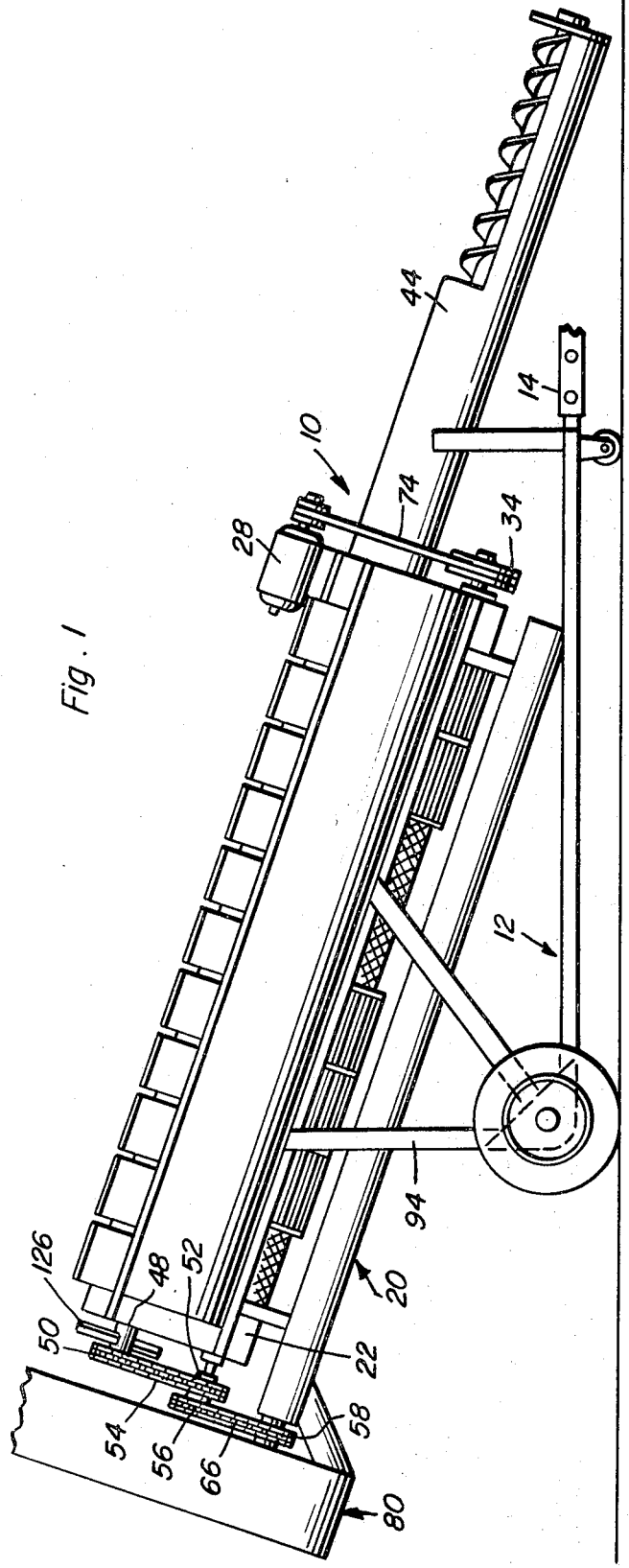
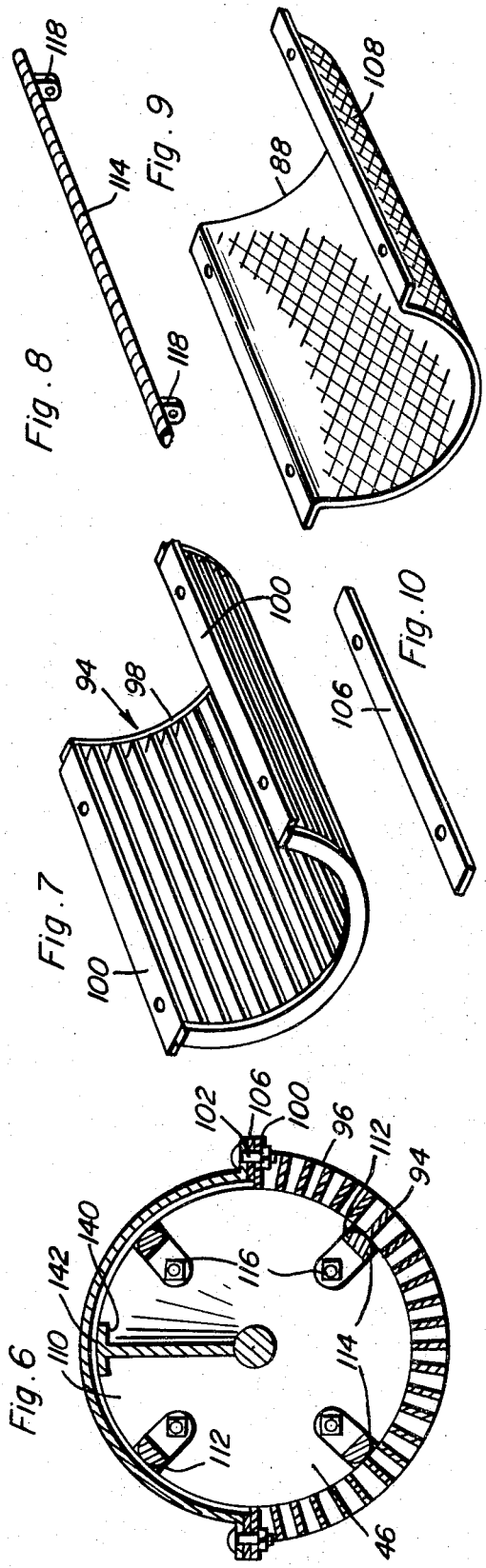

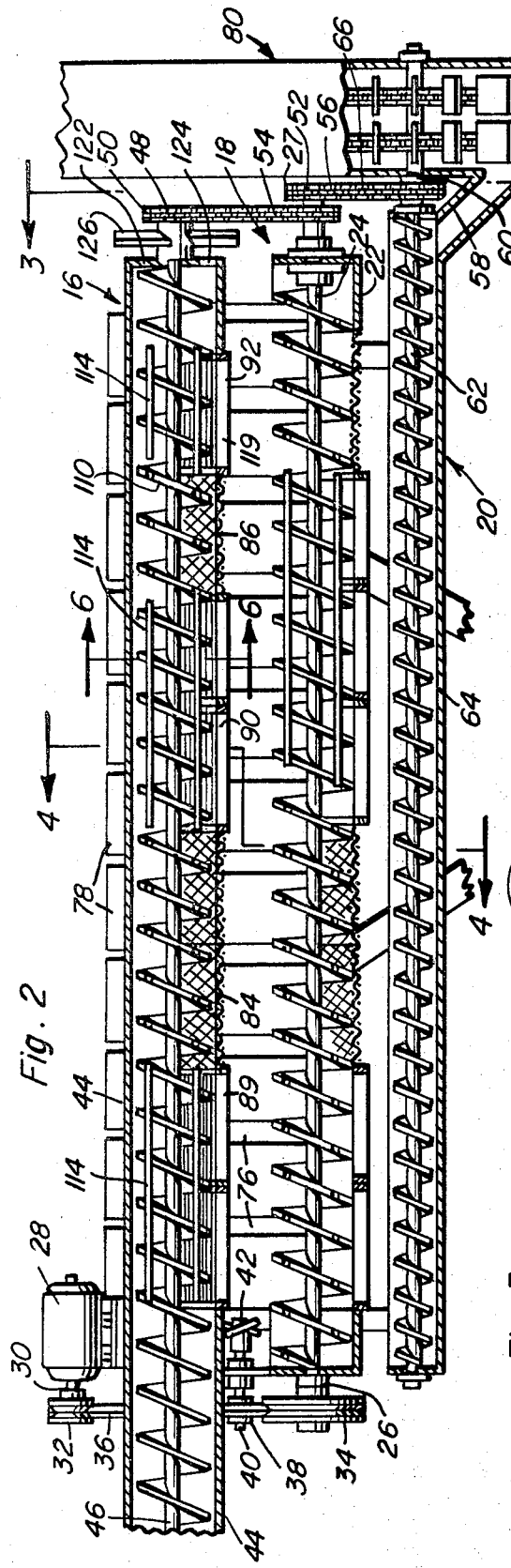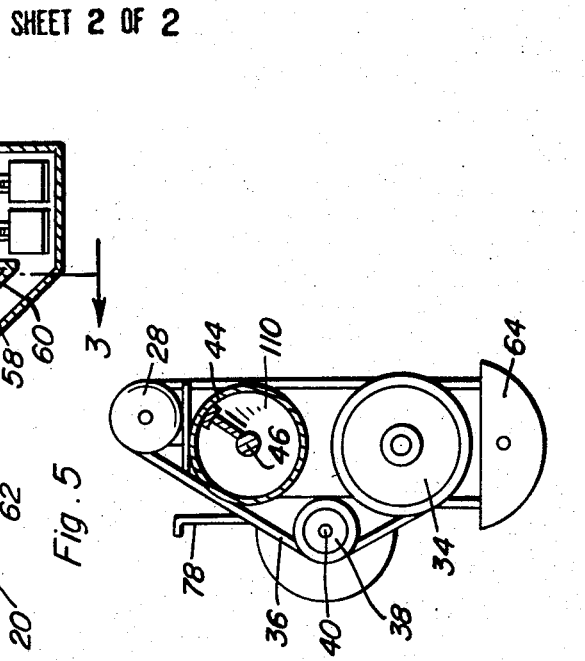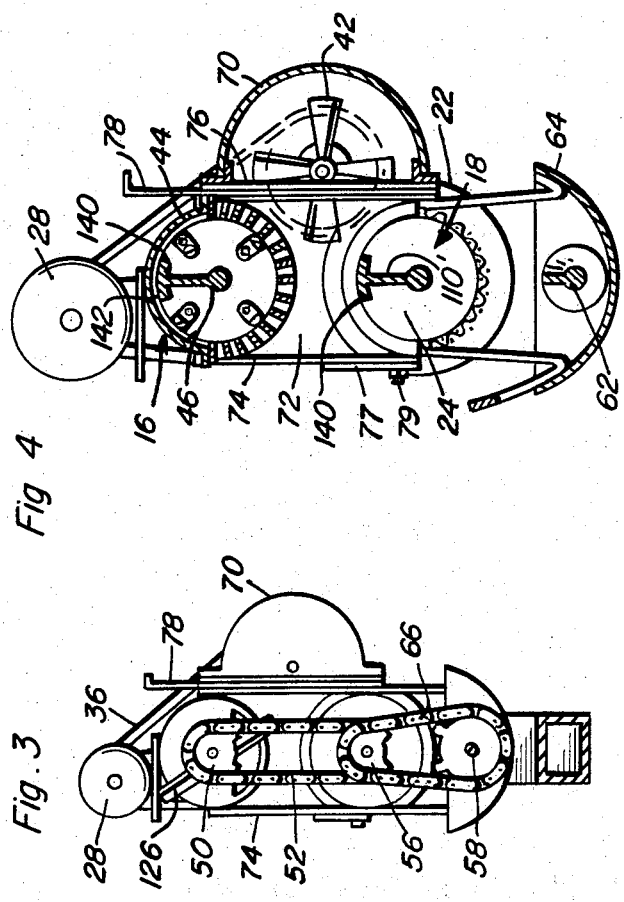

COMBINED HARVESTER, GRAIN AUGER AND CLEANER

This invention comprises an improvement over the grain auger and cleaner disclosed in my prior U.S. Pat. No. 3,249,220, dated May 3, 1966.

The combined harvester, grain auger and cleaner of the instant invention includes upper and lower vertically registered and spaced apart inclined auger assemblies and the upper assembly includes coarse screening sections which allow the grain being conveyed and any remaining fine seeds and chaff to fall downwardly into the lower assembly while the remaining coarse weed seeds are further conveyed upwardly in the upper assembly. The lower assembly includes finer screening sections for passing through the finer weed seeds remaining and the grain being conveyed is conveyed upwardly to the upper end of the lower assembly. Each of the upper and lower assemblies includes spaced sections thereof in which the usual screen portions of the outer housing thereof have been replaced by grates and the corresponding portions of the auger screws are provided with circumferentially spaced and longitudinally extending cylindrical bars. These grated sections of the outer housings of the assemblies and the coacting portions of the auger screws provided with circumferentially spaced cylindrical bars function to thresh the cut grain being carried upwardly along the conveyor assemblies. The spacing between each grating and the corresponding cylindrical bars may be adjusted and finer or closer spacing is utilized between the grates and the bars in the upper end portions of the auger assemblies.

The main object of this invention is to provide a grain auger and cleaner having grain cutting means operatively associated with its forward end and means for conveying the cut grain upwardly into the forward end of the upper conveyor assembly of the cleaner.

Another object of this invention, in accordance with the immediately preceding object, is to provide the auger conveyor assemblies of the cleaner with longitudinally spaced grate sections with which portions of the corresponding auger screws provided with circumferentially spaced and longitudinally extending cylindrical bars coact in order to form threshing stations whereby the cut grain delivered to the inlet end of the upper auger conveyor assembly may be threshed as well as have the grain cleaned and elevated to a suitable point of discharge.

Yet another object of this invention is to provide an apparatus in accordance with the preceding objects and including adjustable airflow producing means for blowing the chaff and some of the lighter fine seeds from the grain as the grain being conveyed falls by gravity from one elevation to a second.

A final object of this invention to be specifically enumerated herein is to provide a combined harvester, grain auger and cleaner which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a side elevational view of the combined harvester, grain auger and cleaner;

FIG. 2 is a longitudinal vertical sectional view taken substantially upon a plane passing through the longitudinal centerline of the grain auger illustrated in FIG. 1, but as seen from the background of FIG. 1;

FIG. 3 is an end elevational view of the combined harvester, auger and cleaner as seen from the right side of FIG. 2, and with the grain elevating structure thereof removed;

FIG. 4 is a fragmentary enlarged transverse vertical sectional view taken substantially upon the plane indicated by section line 4—4 of FIG. 2;

FIG. 5 is an end elevational view of the instant invention as seen from the left side of FIG. 2, with the end portion of the extension removed;

FIG. 6 is an enlarged fragmentary transverse vertical sectional view taken substantially upon the plane indicated by the section line 6—6 of FIG. 2;

FIG. 7 is an enlarged perspective view of one of the grate sections of the cleaner;

FIG. 8 is an enlarged perspective view of one of the cylindrical bars of the invention to be utilized on the auger screws for coaction with the grate section illustrated in FIG. 7;

FIG. 9 is a perspective view of one of the conventional sieve or screen sections; and FIG. 10 is a perspective view of one of the spacing shims which may be utilized to vary the spacing between the auger screws and the grate and sieve sections.

Referring now more specifically to the drawings, the numeral 10 generally designates the combined harvester, grain auger and cleaner of the instant invention.

The assembly 10 is mounted on a wheeled frame referred to in general by the reference numeral 12 and including a forwardly projecting towing tongue 14 adapted to be connected to any suitable prime mover.

The assembly 12 includes a first upper auger conveyor referred to in general by the reference numeral 16, a second lower auger conveyor referred to in general by the reference numeral 18 and a third lowermost auger conveyor referred to in general by the reference numeral 20 disposed below the auger conveyor 18.

The second auger conveyor 18 comprises the base conveyor from which the conveyors 16 and 20 are supported. The conveyor 18 includes an outer cylindrical housing 22 which opens upwardly toward the conveyor 16 and the housing 22 has a longitudinally extending auger screw member 24 journaled therein. The front or left end of the auger screw member 24 illustrated in FIG. 2 of the drawings includes an outwardly extending shaft portion 26 which is driven from a motor 28 supported atop the conveyor assembly 16. The motor 28 includes an output shaft 30 upon which a drive pulley 32 is mounted and the shaft portion 26 has a pulley 34 mounted thereon which is driven from the pulley 32 by means of an endless belt 36. The endless belt 36 is also trained about a pulley 38 carried by the front end of a blower shaft 40 having a blower blade assembly 42 mounted on its other end.

The auger conveyor 16 includes a cylindrical housing 44 through which an elongated longitudinal auger screw member 46 is journaled. The rear end of the auger screw 46 includes an extension 48 upon which a sprocket wheel 50 is mounted. In addition, the shaft portion 26 has a sprocket wheel 52 mounted thereon and an endless drive chain 54 is trained about the sprocket wheels 50 and 52. Still further, the shaft portion 26 includes a rear extension 27 and a second sprocket wheel 56 is mounted thereon and aligned with a sprocket wheel 58 carried by the forward extension 60 of an auger screw member 62 journaled through the upwardly opening semi-cylindrical housing portion 64 of the auger conveyor 20. An endless drive chain 66 is trained about the sprocket wheels 56 and 58. Therefore, the motor 28 drives the auger screw member 24 and the latter drives the shaft extensions 48 and 60.

A semi-cylindrical horizontally opening shield 70 is disposed to one side of and opens into the area 72 between the auger conveyors 16 and 18. The blower member 42 is disposed in one end of the shield 70 and is operative to blow air upwardly through the shield 70. Disposed on the opposite side of the area 72 between the auger conveyors 16 and 18 are a plurality of upstanding braces 74 spaced longitudinally of the assembly 10 and which function to support the upper conveyor assembly 16 from the lower conveyor assembly 18. In addition, a plurality of similar supports 76 are secured between the sides of the housings 44 and 22 adjacent the shield 70. Still further, a plurality of airflow controlling gates or panels 78 are supported from the supports 76 for vertical shifting relative to the latter and a plurality of elongated longitudinally extending and aligned discharge regulating plates 77 are provided and extend along the housing 22 and are supported from the latter by fasteners 79 secured through upstanding slots (not shown) in the plates 77 and the adjacent wall of the housing 22 for varied vertical shifting of the plates 77 relative to the housing 22. The gates or panels 78 are utilized to regulate the flow of air from within the shield 70 laterally into the area 72 between the upper and lower conveyors 16 and 18 and the plates 77 regulate the flow of air laterally outwardly of the area 72.

A pickup device or conveyor assembly 80 is provided on the upper or rear end of the assembly 10 and is operable to receive cleaned grain from the discharge end of the auger conveyor 20 and to convey the grain upwardly to a suitable discharge outlet (not shown). The conveyor assembly 16 includes first and second sections thereof designated by the reference numerals 84 and 86 which consist of a plurality of screening sieves. The sieves 84 comprise fine sieves and the sieves 86 comprise coarser sieves. Each sieve is in the form of a semi-cylindrical member such as that designated by the reference numeral 88 in FIG. 9 and is removably secured in place. In addition, the auger conveyor 16 includes first and second grating sections 89 and 90 and a straw chopper or grinder section 92. Each of the grating sections 89 and 90 consists of a plurality of semi-cylindrical grates such as that designated by the reference numeral 94 in FIG. 7.

With attention now invited more specifically to FIG. 6, it may be seen that each grate 94 comprises a plurality of grating bars 96 secured between semi-cylindrical end members 98 and mounted by means of apertured opposite side flanges 100 secured to the opposite side flanges 102 of the downwardly opening cover portion 104 of the conveyor assembly 16. In addition, in order to vary the spacing between the outer peripheral portion of the auger screw 46 and the grating bars 96, spacing bars 106 may be disposed between the flanges 100 and 102. The sieves 88 include opposite side flanges 108 corresponding to the flanges 100 and are accordingly supported from the flanges 102 in the same manner whereby the spacing between the sieves 88 and the outer peripheral portions of the auger screw 46 may be adjusted.

The spiral flutes 110 of the auger screw 46 are provided with circumferentially spaced and aligned outwardly opening grooves 112 and the flutes registered with the grate sections 89 and 90 have serrated threshing bars 114 received in the corresponding grooves 112 and secured to the flutes 110 by means of fasteners 116 secured through apertured mounting tabs 118 carried by the opposite ends of each bar 114 and secured through the flutes 110.

Inasmuch as the grates 94 and sieves 88 are removable, one may be substituted for the other and inasmuch as all of the flutes 110 have grooves 112 formed therein the screening sections 84 and 86 as well as the threshing sections defined by the grates 89 and 90 may be shifted in position longitudinally of the conveyor assembly 16.

The grates 89 may be adjusted further away from the auger screw 46 than the grates 90 and the grinder section 92 comprises a plurality of side-by-side serrated bars 119 (similar to bars 96), but without spaces therebetween for chopping and grinding the straw before being discharged through the opening 124.

The auger conveyor 18 is substantially identical to the auger conveyor 16 in general structure, except that the housing 22 of the auger conveyor 18 opens upwardly toward the auger assembly 16 and the auger conveyor 18 does not include a straw chopping section similar to section 92.

The auger assembly 20 includes an imperforate semi-cylindrical housing portion 64 and therefore the auger conveyor 20 serves only to convey the material falling down thereinto upwardly along the auger conveyor 20 to the upper end sump 120 thereof with which the lower end of the conveyor assembly 80 is operatively associated.

The upper end wall 122 of the housing 44 includes an opening 124 formed therein and the upper end of the auger screw 46 projects through the end wall 122 and has a straw spreader fan 126 mounted thereon.

As the grain is fed into the lower or left-hand end of the auger conveyor 16, the cut grain is threshed by the bars 114 and the grates 94 in the grate sections 89 and 90. In addition, the grain is screened in the screening sections 84 and 86 and the straw remaining in the upper end of the auger conveyor 16 is discharged through the opening 124 and spread by the spreader fan 126. The material falling downwardly from the grating sections 89 and 90 and the sieve sections 84 and 86 is received by the upwardly opening auger conveyor 18 for further action thereon by the auger conveyor 18. However, the finer weed seeds and chaff falling from the conveyor assembly 16 toward the conveyor assembly 18 are acted upon by the air being discharged laterally from within the shield 70 past the variably vertically adjusted gates or panels 78. The heavier seeds and portions of cut grain which are not blown laterally outwardly from the area 72 are received by the upwardly opening auger conveyor and further acted thereon in a manner which is believed to be obvious from the foregoing description of the operation of the auger conveyor 16. Then, the material falling from the auger conveyor 18 is received by the auger conveyor 20 and conveyed upwardly therealong before being discharged through the outlet 120.

The outer peripheral edges of the spiral flutes 110 of the auger screw 46 and the outer peripheral edges of the spiral flutes 110' of the auger screw 24 include transversely enlarged crosshead portions 140, see FIGS. 4 and 6, whose outer surfaces are corrugated as at 142. The crosshead portions 140 function to create a more complete threshing action on the material being handled as the crosshead portions 40 swing over the inner marginal edge portions of the grating bars 96.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A grain auger conveyor including inclined upper and lower vertically spaced and registered elongated and generally parallel screw auger assemblies, each of said assemblies including a driven auger screw journaled in a casing, the lower periphery of the casing of the upper assembly including screening portions spaced therealong, the casing of said lower assembly opening upwardly toward the screening portions of the upper assembly, said lower casing also including screening portions spaced along the lower periphery thereof, said conveyor including an elongated shroud extending along and enclosing the outer, upper and lower sides of a zone disposed to one side of and extending along the areas defined between the assemblies and opening laterally into said area, a plurality of airflow regulating slides spaced along said assembly and supported therefrom for guided independent variable shifting laterally of the auger screw assemblies in a plane generally paralleling the plane containing said assemblies between closed side-by-side positions closing the side of said zone adjacent said area from the latter and at least partially open positions establishing at least partial direct communication between said zone and said area, means operative to supply air under pressure to said zone for variable lateral discharge therefrom into said area past said slides, the other side of said area being open.

2. The combination of claim 1 wherein said conveyor further includes longitudinally extending air regulating plates supported therefrom on the side of said area remote from said zone and adjustably shiftable into and out of at least partial registry with said open side of said area for partial throttling of said discharge laterally outwardly therefrom.

3. The combination of claim 1 wherein the casings of said upper and lower screw auger assemblies include longitudinally spaced grate portions, the flutes of the auger screw of said assemblies registrable with said grate portions including circumferentially spaced longitudinally extending bars disposed about the outer peripheral portions of said flutes.

4. The combination of claim 3 wherein said flutes are notched and seatingly receive the adjacent portions of said bars therein.

5. The combination of claim 4 wherein said bars are cylindrical.

6. The combination of claim 5 including means supporting said grates and said screening portions from said casings for adjustable shifting of said grates and screening portions generally radially of the axes of rotation of the corresponding auger screws.

7. The combination of claim 6 wherein the radial outermost edge portions of said flutes are transversely enlarged.

8. A grain auger conveyor including inclined upper and lower vertically spaced and registered elongated and generally parallel screw auger assemblies, each of said assemblies including a driven auger screw journaled in a casing, the lower periphery of the casing of the upper assembly including screening portions spaced therealong, the casing of said lower assembly opening upwardly toward the screening portions of the upper assembly, said lower casing also including screening portions spaced along the lower periphery thereof, the casings of said upper and lower auger screw assemblies including longitudinally spaced grate portions, the flutes of the auger screws of said assemblies registrable with said grate portions including circumferentially spaced outer peripheral bars extending longitudinally of said auger screws.

9. The combination of claim 8 wherein said flutes are notched and seatingly receive the adjacent portions of said bars therein.

10. The combination of claim 9 wherein said bars are cylindrical.

11. The combination of claim 8 including means supporting said grate portions and said screening portions from said casings for adjustable shifting of said grate portions and screening portions generally radially of the axes of rotation of the corresponding auger screws.

12. The combination of claim 8 wherein the outer peripheral edges of the flutes of the auger screws of said assemblies include transversely enlarged head portions whose outer surfaces are corrugated so as to function more thoroughly in threshing the grain between the head portions and the grating bars of the corresponding grates.

* * * * *